Oct. 20, 1925.

W. Y. ELLIOTT 1,557,677

RESILIENT WHEEL

Filed June 30, 1925

Inventor
W. Y. Elliott
By Watson E. Coleman
Attorney

Oct. 20, 1925.
W. Y. ELLIOTT
1,557,677
RESILIENT WHEEL
Filed June 30, 1925
2 Sheets-Sheet 2
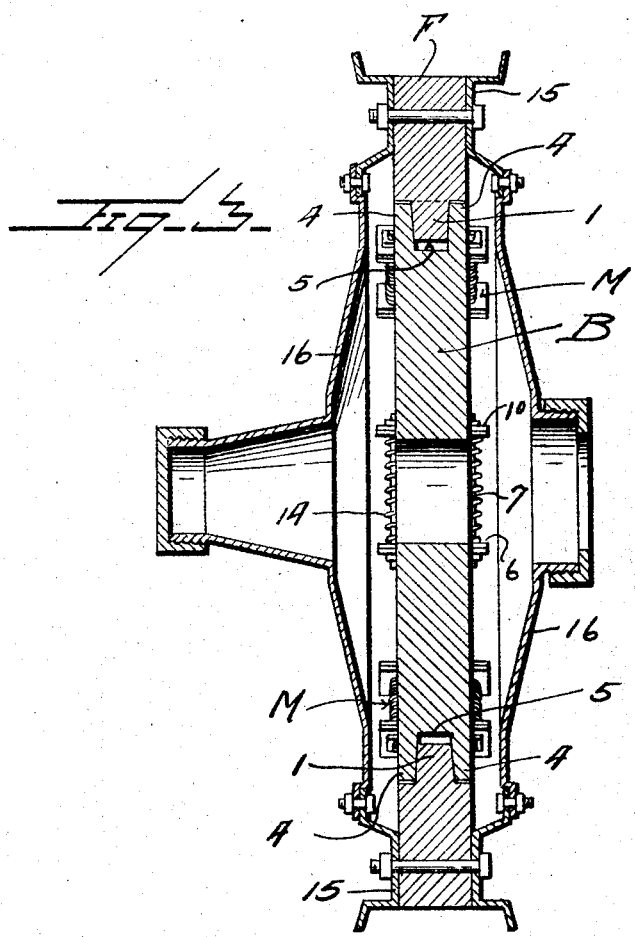
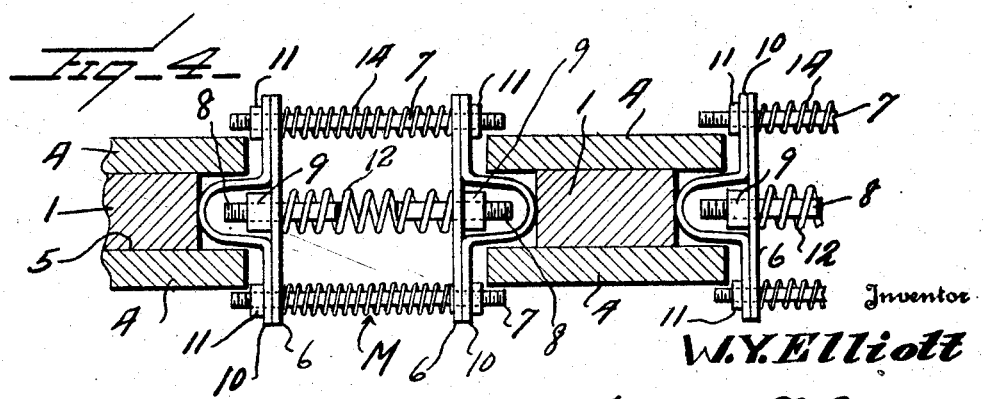
Inventor
W. Y. Elliott
By Watson E. Coleman
Attorney Patented Oct. 20, 1925.

1,557,677

UNITED STATES PATENT OFFICE.

WILLIAM YANCEY ELLIOTT, OF DEER LODGE, MONTANA.

RESILIENT WHEEL.

Application filed June 30, 1925. Serial No. 40,589.

*To all whom it may concern:*

Be it known that I, WILLIAM YANCEY ELLIOTT, a citizen of the United States, residing at Deer Lodge, in the county of Powell and State of Montana, have invented certain new and useful Improvements in Resilient Wheels, of which the following is a specification, reference being had to the accompanying drawings.

This invention relates to resilient wheels and has relation more particularly to a device of this general character of a disk type and it is an object of the invention to provide a substantial wheel with a cushioning medium coacting with the body of the wheel and the felly thereof to absorb undue shocks that may be imposed upon the wheel.

Another object of the invention is to provide a novel and improved device of this general character comprising a felly structure and a body structure arranged within the felly structure and interlocked therewith, the operative or driving connection between the felly structure and the body constituting a cushioning medium operating to absorb the excessive shocks to which the wheel may be subjected and thereby permitting the use of a pneumatic tire inflated to a pressure below the normal pressure required in the standard type of tire and thereby providing for greater flexibility resulting in easy riding and a material reduction of the strain upon the machne.

The invention consists in the details of construction and in the combination and arrangement of the several parts of my improved resilient wheel whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 3 is a sectional view taken diametrically through a complete wheel structure embodying my invention;

Figure 4 is an enlarged fragmentary detailed view partly in section and partly in plan illustrating in detail the cushioning member as herein employed and in applied position.

Figure 1:
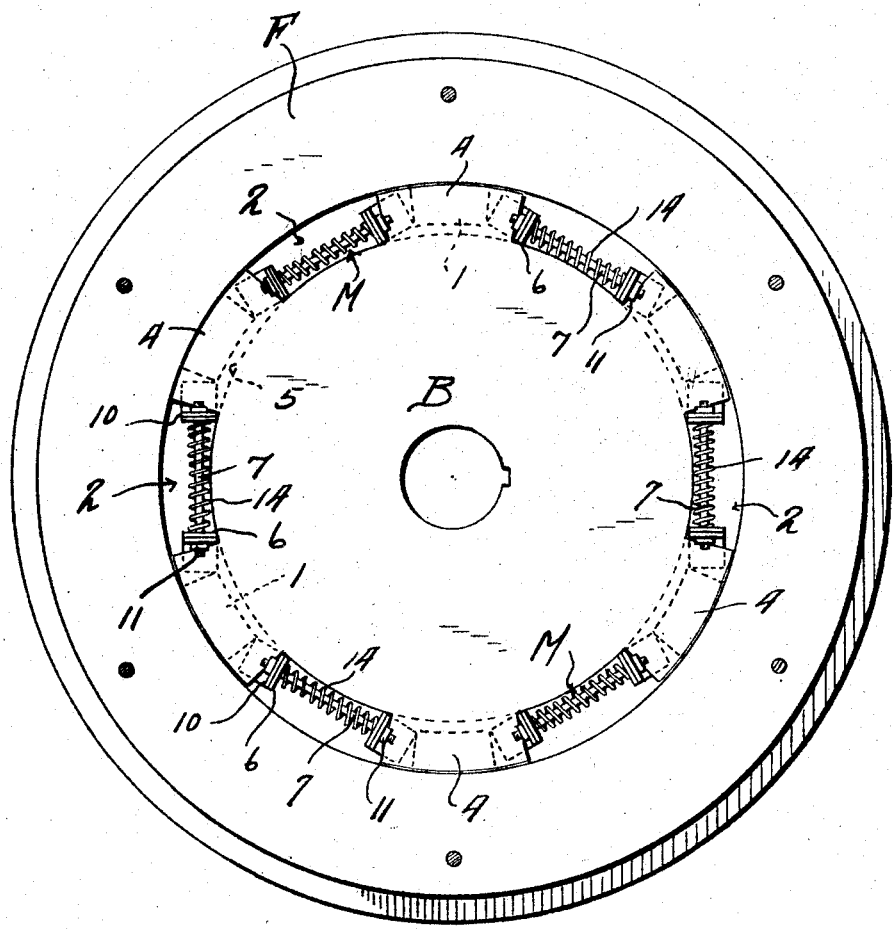
Figure 1 is a view in side elevation of a wheel constructed in accordance with my invention with the side plates removed.
Figure 2:
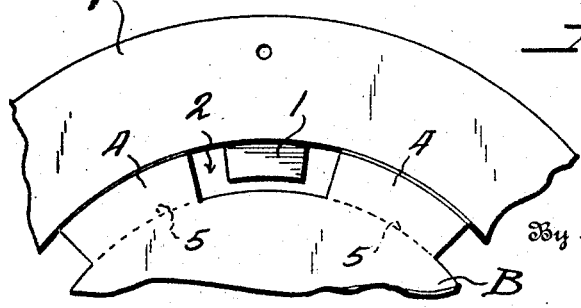
Figure 2 is a fragmentary view of the felly structure and wheel body as illustrated in Figure 1 in a second position.

As disclosed in the accompanying drawings, my improved wheel comprises a felly F of desired dimensions and which has extending inwardly from its inner edge wall at substantially its transverse center a plurality of circumferentially and equidistantly spaced lugs 1. Snugly fitting within the central opening defined by the felly F is the body B of the wheel having its peripheral marginal portion provided with a series of circumferentially disposed recesses 2 each of a length less than the space between a pair of adjacent lugs 1. The marginal parts of the body between the recesses 2 constitute outstanding flanges 4 the peripheries of which closely approach the inner edge wall of the felly F and said flanges 4 have disposed lengthwise therethrough grooves or channels 5 which receive the lugs 1 in the normal assembly of the wheel structure whereby the felly F and the body B are effectively maintained against lateral displacement. The body B is adapted to be keyed or otherwise fixed to an axle spindle or the like.

The flanges 4 may readily pass between the lugs 1 in assembling the wheel structure and by a slight rotation of the body B the lugs 1 will be readily received within the grooves or channels 5. The body B and the felly F may be separated by the same facility upon a reverse operation.

Engaged within each of the recesses 2 is a cushioning medium M and as herein disclosed such medium comprises a pair of plates 6 having freely disposed through the opposite end portions thereof the shanks 7 while the central portion of the plates 6 has freely disposed therethrough the pins 8, the extent of insertion of said pins 8 being controlled by the nuts 9 threaded upon the outer ends of the pins and contacting with the plates 6. The shanks 7 entirely bridge the space between the plates 6. Overlying the outer faces of the plates 6 are the additional plates 10 through the opposite end portions of which the shanks 7 are also freely disposed, the extremities of said shanks 7 having engaged therewith the nuts 11 for contact with the outer faces of the plates 10.

Interposed between the plates 6 and surrounding the inner or opposed end portions of the pins 8 is an expansible member 12 herein disclosed as a coil spring of desired tension and surrounding the shanks 7 between the plates 6 are the coil springs 14 each of a tension less than the member or spring 12. The central portion of each of the plates 10 is disposed on an outbow to bridge the adjacent outer end portion of a pin 8 and the nut 9 thereon and also to provide an extension or projection to extend within the adjacent end portion of a groove or channel 5 whereby the cushioning medium in its entirety is maintained in required applied position.

By proper adjustment of the nuts 11 the tension of the members or springs 12 and 14 may be regulated or varied as the occasions of practice may prefer.

Bolted or otherwise secured to the opposite sides of the felly F are the annular plates 15 having their outer marginal portions extending beyond the periphery of the felly F to provide retaining flanges for a tire rim. The central opening of each of these annular plates 15 is closed by a plate 16 bolted or otherwise secured thereto, said plate 16 being readily removable to have access to the body B for the replacement or adjustment of a shock absorbing medium.

From the foregoing description it is thought to be obvious that a resilient wheel constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A resilient wheel comprising, in combination, a felly, a wheel body substantially snugly fitting within the opening defined by the felly, the marginal portion of the body being provided therearound with spaced recesses, the marginal parts of the body between the recesses constituting flanges, said flanges being provided with circumferentially disposed grooves, inwardly directed lugs carried by the felly and disposed circumferentially therearound, said lugs being received within the grooves of the flanges, the recesses being of a length less than the space between adjacent lugs, and a shock absorbing medium positioned within each of the recesses and coacting with the felly.

2. A resilient wheel comprising, in combination, a felly, a wheel body substantially snugly fitting within the opening defined by the felly, the marginal portion of the body being provided therearound with spaced recesses, the marginal parts of the body between the recesses constituting flanges, said flanges being provided with circumferentially disposed grooves, inwardly directed lugs carried by the felly and disposed circumferentially therearound, said lugs being received within the grooves of the flanges, the recesses being of a length less than the space between adjacent lugs, a shock absorbing medium positioned within each of the recesses and coacting with the felly, said shock absorbing medium comprising a pair of plates provided with projections to extend within the grooves of adjacent flanges, and an expansible member interposed therebetween.

3. A resilient wheel comprising, in combination, a felly, a wheel body substantially snugly fitting within the opening defined by the felly, the marginal portion of the body being provided therearound with spaced recesses, the marginal parts of the body between the recesses constituting flanges, said flanges being provided with circumferentially disposed grooves, inwardly directed lugs carried by the felly and disposed circumferentially therearound, said lugs being received within the grooves of the flanges, the recesses being of a length less than the space between adjacent lugs, a shock absorbing medium positioned within each of the recesses and coacting with the felly, said shock absorbing medium comprising a pair of plates provided with projections to extend within the grooves of adjacent flanges, an expansible member interposed theretbetween, the extremities of said plates having shanks interposed therebetween and freely disposed therethrough, stop members carried by said shanks outwardly of the plates, and springs surrounding said shanks.

4. A resilient wheel comprising, in combination, a felly, a wheel body substantially snugly fitting within the opening defined by the felly, the marginal portion of the body being provided therearound with spaced recesses, the marginal parts of the body between the recess constituting flanges, said flanges being provided with circumferentially disposed grooves, inwardly directed lugs carried by the felly and disposed circumferentially therearound, said lugs being received within the grooves of the flanges, the recesses being of a length less than the space between adjacent lugs, a shock absorbing medium positioned within each of the recesses and coating with the felly, annular side plates secured to the felly, and removable plates closing the central openings defined by the first named plates.

In testimony whereof I hereunto affix my signature.

WILLIAM Y. ELLIOTT.